United States Patent
Gottemukkula (10) Patent No.: US 10,853,642 B2
(45) Date of Patent: Dec. 1, 2020

(54) FUSING MULTI-SPECTRAL IMAGES FOR IDENTITY AUTHENTICATION

(71) Applicant: Alibaba Group Holding Limited, George Town (KY)

(72) Inventor: Vikas Gottemukkula, Kansas City, KS (US)

(73) Assignee: Advanced New Technologies Co., Ltd., Grand Cayman (KY)

(*) Notice: Subject to any disclaimer, the term of this patent is extended or adjusted under 35 U.S.C. 154(b) by 5 days.

(21) Appl. No.: 16/361,453

(22) Filed: Mar. 22, 2019

(65) Prior Publication Data

US 2020/0302149 A1 Sep. 24, 2020

(51) Int. Cl.
*G06K 9/00* (2006.01)
*G06K 9/62* (2006.01)
*G06N 3/08* (2006.01)

(52) U.S. Cl.
CPC ....... *G06K 9/0061* (2013.01); *G06K 9/00617* (2013.01); *G06K 9/6256* (2013.01); *G06N 3/08* (2013.01)

(58) Field of Classification Search
CPC ............. G06K 9/0061; G06K 9/00617; G06K 9/6256; G06N 3/08
See application file for complete search history.

(56) References Cited

U.S. PATENT DOCUMENTS

| | | | |
|---|---|---|---|
| 2011/0182483 A1* | 7/2011 | Du | G06K 9/0061 382/117 |
| 2012/0007979 A1* | 1/2012 | Schneider | G06K 9/0063 348/116 |
| 2017/0076145 A1* | 3/2017 | Gottemukkula | G06K 9/00288 |
| 2019/0087726 A1* | 3/2019 | Greenblatt | G06N 5/046 |

* cited by examiner

*Primary Examiner* — Phuoc Tran
(74) *Attorney, Agent, or Firm* — Fish & Richardson P.C.

(57) ABSTRACT

Methods, systems, and apparatus, including computer programs encoded on a computer storage medium, for determining the identity of a user. In one aspect, a method comprises: obtaining a multi-spectral image that depicts an eye of a user, wherein the multi-spectral image comprises a plurality of registered two-dimensional channels, and each two-dimensional channel corresponds to a different spectrum of the multi-spectral image; processing the multi-spectral image using an encoder neural network to generate a fused image, wherein the fused image has a single two-dimensional channel; determining a set of features characterizing the eye of the user from the fused image; and determining an identity of the user based at least in part on the set of features characterizing the eye of the user.

17 Claims, 4 Drawing Sheets

FUSING MULTI-SPECTRAL IMAGES FOR IDENTITY AUTHENTICATION

BACKGROUND

This specification relates to identity authentication systems.

An identity authentication system can be used to determine the identity of a user, for example, a user of a kiosk (e.g., an ATM kiosk) or a personal device (e.g., a smartphone). In some cases, an identity authentication system can determine the identity of a user based at least in part on biometric features derived from the unique appearance of the eye of the user.

SUMMARY

This specification describes an authentication system implemented as computer programs on one or more computers in one or more locations that can process a multi-spectral image depicting an eye of a user using an encoder neural network to generate a single-channel fused image. The authentication system can authenticate the identity of the user based at least in part on features determined from the fused image.

According to a first aspect there is provided a method performed by one or more data processing apparatus, the method including: obtaining a multi-spectral image that depicts an eye of a user, where the multi-spectral image includes a plurality of registered two-dimensional channels, and each two-dimensional channel corresponds to a different spectrum of the multi-spectral image; processing the multi-spectral image using an encoder neural network to generate a fused image, where the fused image has a single two-dimensional channel; determining a set of features characterizing the eye of the user from the fused image; and determining an identity of the user based at least in part on the set of features characterizing the eye of the user.

In some implementations, the multi-spectral image includes one or more of: a red color channel, a green color channel, a blue color channel, an infrared channel, and an ultraviolet channel.

In some implementations, the encoder neural network includes multiple convolutional neural network layers.

In some implementations, determining the set of features characterizing the eye of the user from the fused image includes: identifying positions of multiple interest points in the fused image; and generating a respective feature descriptor corresponding to each interest point using the fused image.

In some implementations, determining the identity of the user based at least in part on the set of features characterizing the eye of the user includes: using the set of features characterizing the eye of the user to determine a respective match score between the user and each of one or more reference users, where the match score between the user and a reference user characterizes a likelihood that the identity of the user matches an identity of the reference user; and determining the identity of the user matches the identity of a particular reference user based on the match scores.

In some implementations, determining a match score between the user and a reference user includes: determining a first match score based on eyeprint features that characterize a portion of the eye outside an iris of the eye; determining a second match score based on iris features that characterize the iris of the eye; and determining the match score based on the first match score and the second match score.

In some implementations, the encoder neural network is trained by performing operations including: obtaining a training multi-spectral image; processing the training multi-spectral image using the encoder neural network, in accordance with current values of encoder neural network parameters, to generate a training fused image; generating a target image, including: segmenting the training multi-spectral image into multiple regions; determining, for each region, a target region based on an appearance of the region in one or more channels of the training multi-spectral image; and spatially concatenating the target regions to generate the target image; determining gradients of an unsupervised loss with respect to the encoder neural network parameters, where the unsupervised loss includes a measure of similarity between: (i) the training fused image, and (ii) the target image; and using the gradients to adjust the current values of the encoder neural network parameters.

In some implementations, the multiple regions include one or more of: a skin region, a sclera region, and an iris region.

In some implementations, the encoder neural network is trained by performing operations including: obtaining a training multi-spectral image that depicts an eye of a training user; processing the training multi-spectral image using the encoder neural network, in accordance with current values of encoder neural network parameters, to generate a training fused image; processing the training fused image using a classification neural network, in accordance with current values of classification neural network parameters, to generate a classification output that characterizes a predicted identity of the training user; determining gradients of a supervised loss with respect to the encoder neural network parameters, where the supervised loss is based on the classification output; and using the gradients to adjust the current values of the encoder neural network parameters.

According to a second aspect there is provided a system including: one or more computers; and one or more storage devices communicatively coupled to the one or more computers, where the one or more storage devices store instructions that, when executed by the one or more computers, cause the one or more computers to perform some or all of the operations of the first aspect.

According to a third aspect there are provided one or more non-transitory computer storage media storing instructions that when executed by one or more computers cause the one or more computers to perform some or all of the operations of the first aspect.

Particular embodiments of the subject matter described in this specification can be implemented so as to realize one or more of the following advantages.

The system described in this specification can identify a user (i.e., determine the identity of the user) by processing a multi-spectral image depicting an eye of the user using an encoder neural network to generate a fused image. Thereafter, the system can identify the user using features characterizing the eye of the user which are derived from the fused image.

The system described in this specification can use machine learning training techniques to learn parameter values of the encoder neural network which enable the encoder neural network to generate discriminative fused images (i.e., fused images which can be used to accurately identify users). In contrast, some conventional systems identify users using hand-crafted features (i.e., rather than learned features) which may be less effective at discriminating between users. By using learned features rather than hand-crafted features, the system described in this specification may achieve a higher level of accuracy in identifying users than some conventional systems.

The system described in this specification can identify a user based on features characterizing the eye of the user that are derived from multiple image channels (e.g., red, green, blue, and infrared channels). Each channel may characterize certain properties of the eye of the user more clearly than the other channels. For example, an infrared channel may clearly depict patterns in the iris, while a green or blue channel may clearly depict the vasculature in the white of the eye. By identifying users based on features derived from the multiple image channels of multi-spectral images, the system described in this specification may achieve a higher level of accuracy than some conventional systems that identify users without the benefit of multi-spectral imaging.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification describes an authentication system that can determine the identity of a user based at least in part on a set of features which characterize one or both of the eyes of the user. The eyes of a user can have unique properties which distinguish them from the eyes of other users. Therefore, properties of the eyes of a user can be used in determining the identity of the user. The properties of an eye can include, for example, the vasculature structure in the sclera (i.e., the white) of the eye, the color and texture of the iris of the eye, and the texture in periocular region.

As will be described in more detail below, the authentication system can generate features characterizing the eye of a user from a fused image that is generated by fusing a multi-spectral image depicting the eye. The authentication system described in this specification can be used in any of a variety of settings. A few examples follow.

In some implementations, the authentication system is used in a kiosk. For example, the kiosk may be an automated teller machine (ATM) that allows users to deposit money, withdraw money, or view their financial information. As another example, the kiosk may be deployed at the entrance to a location (e.g., an arena or stadium), and may grant or deny users access to the location. As another example, the kiosk may be deployed at a restaurant (e.g., a fast-food outlet), and may allow users to order and pay for food. In this example, the kiosk may include a display device (e.g., a capacitive touch screen) that allows a user to select and order food. Once the user completes the selection (e.g., by user-interfaces presented on the display device), the user may be prompted to look towards a kiosk camera. The authentication system may use the kiosk camera to capture a multi-spectral image of one or both of the eyes of the user. The authentication system may process the multi-spectral image to generate a fused image, and thereafter use features derived from the fused image in determining the identity of the user. After the authentication system determines the identity of the user, the kiosk may deduct payment for the food from a bank account associated with the identity of the user.

In some implementations, the authentication system is used in a personal device of a user, for example, a smartphone, smartwatch, or desktop computer. The device may use the authentication system to determine the identity of the user before allowing the user to perform "restricted" actions. Examples of restricted actions may include unlocking the device, accessing certain data using the device (e.g., financial data or medical data), or performing certain actions using the device (e.g., downloading applications or changing passwords). When the device determines a user is attempting to perform a restricted action, the authentication system may use a device camera to capture a multi-spectral image of one or both of the eyes of the user. The authentication system may process the multi-spectral image to generate a fused image, and thereafter use features derived from the fused image in determining the identity of the user. After the authentication system determines the identity of the user, the device can determine whether the user is authorized to perform the restricted actions.

Figure 1:
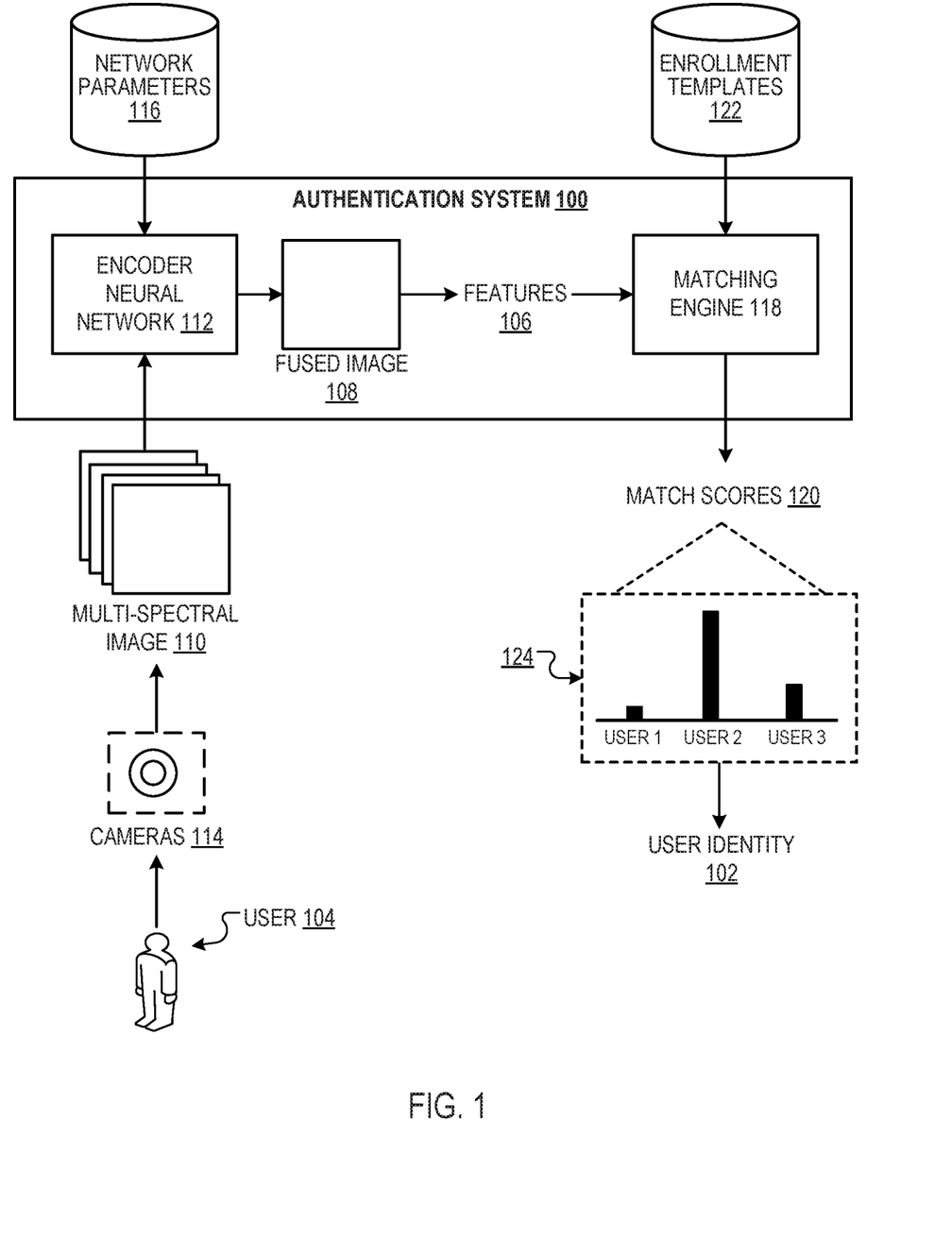
FIG. 1 is a block diagram of an example authentication system.

FIG. 1 is a block diagram of an example authentication system 100. The authentication system 100 is an example of a system implemented as computer programs on one or more computers in one or more locations in which the systems, components, and techniques described below are implemented.

The authentication system 100 is configured to determine the identity 102 of a user 104 (e.g., of a kiosk or a personal device) based at least in part on features 106 characterizing properties of one or both of the eyes of the user 104. For convenience, the description which follows will refer to the features 106 as characterizing one of the eyes of the user 104. The authentication system 100 derives the features 106 from a fused image 108 which is generated by processing a multi-spectral image 110 depicting an eye of the user 104 using an encoder neural network 112. As described earlier, the authentication system 100 may be used in a kiosk (e.g., an ATM kiosk), a personal device (e.g., a smartphone), or as a component of any other appropriate system.

The authentication system 100 uses one or more cameras 114 to capture the multi-spectral image 110 which depicts the eye of the user 104. In addition to depicting the eye of the user 104, the multi-spectral image 110 may depict some or all of the periocular space that is outside the eye of the user (e.g., including the skin around the eye). The cameras 114 may be, for example, integrated components of a kiosk (e.g., an ATM kiosk) or a personal device (e.g., a smartphone) using the authentication system 100 to determine the identity 102 of the user 104.

The multi-spectral image 110 can be represented by a set of multiple "channels", where each channel corresponds to a different spectrum of the multi-spectral image. A channel refers to a two-dimensional array of numerical values (e.g., integer or floating point values). A "spectrum" is defined by a range of wavelengths in the electromagnetic spectrum. A channel of the multi-spectral image that corresponds to a particular spectrum represents light with a wavelength within the range of wavelengths defined by the particular spectrum that is captured by the cameras 114. The multi-spectral image 110 may include channels corresponding to any appropriate set of spectra, including spectra that are outside the range of wavelengths corresponding to visible light. In a particular example, the multi-spectral image 110 may include one or more of: a red color channel, a green color channel, a blue color channel, an infrared channel, and an ultraviolet channel. The channels of the multi-spectral image 110 are "registered", that is, numerical values in corresponding positions in different channels represent light reflecting from the same portion of the environment.

The system 100 can use any appropriate cameras 114 to capture the multi-spectral image 110. In some implementations, the system 100 uses a single integrated multi-spectral camera to capture the multi-spectral image 110. In some other implementations, the system 100 uses multiple cameras 114 which are each configured to capture images corresponding to one or more different spectra. In these implementations, the system 100 can register and concatenate the images captured by the multiple cameras 114 to generate the multi-spectral image 110. The system 100 can use any appropriate image registration technique to register the images, for example, an intensity-based or feature-based image registration method based on a rigid or an elastic registration transformation.

The authentication system 100 processes the multi-spectral image 110 depicting the eye of the user 104 using an encoder neural network 112, in accordance with current values encoder neural network parameters 116, to generate a fused image 108. The fused image 108 has a single channel (in contrast to the multiple channels of the multi-spectral image 110) that integrates information from each channel of the multi-spectral image 110.

The encoder neural network 112 is a convolutional neural network, that is, a neural network that includes one or more convolutional layers. The output layer of the encoder neural network 112 includes a respective neuron corresponding to each component (i.e., pixel) of the fused image 108. The respective activation of each output neuron of the encoder neural network 112 in response to the encoder neural network 112 processing a multi-spectral image defines the intensity value of the corresponding component of the fused image.

The network parameters 116 of the encoder neural network 112 include, for example, data defining the values of the convolutional filters corresponding to each convolutional layer of the encoder neural network 112, as well as any other parameters of the encoder neural network 112. The values of some or all of the network parameters 116 can be determined using any appropriate neural network training procedure. For example, the values of the network parameters 116 can be iteratively adjusted over multiple training iterations using back-propagated gradients of a loss function with respect to the network parameters. An example process for training the encoder neural network is described in more detail with reference to FIG. 4.

In some implementations, the fused image 108 generated by the encoder neural network 112 has the same resolution (i.e., the same channel dimensionality) as the multi-spectral image 110. Alternatively, the fused image 108 may have a lower or higher resolution than the multi-spectral image 110 (e.g., due to one or more pooling or up-sampling layers included the encoder neural network 112).

The features 106 may characterize the color, texture and structure of the eye, and optionally, some or all of the periocular space that is outside the eye (e.g., the skin around the eye). In particular, the features 106 may characterize the vasculature structure in the sclera of the eye, the texture in the periocular space around the eye, the shape of the eye, permanent marks on the skin (e.g., moles) and the sclera, and the iris of the eye.

The authentication system 100 can generate the features 106 characterizing the eye of the user 104 in any appropriate manner. A few examples follow.

For example, the authentication system 100 generate the features 106 by representing the intensity values of the fused image 108 as an ordered collection of numerical values (e.g., a vector of numerical values). In this example, the features 106 correspond directly to the intensity values of the fused image 108.

As another example, to generate the features 106, the authentication system 100 may detect one or more "interest points" in the fused image 108 using an interest point detection algorithm. Each interest point is defined by a position in the fused image 108 (e.g., expressed in the x-y coordinate frame of the fused image 108). The interest point detection algorithm may be, for example, an edge detection algorithm, a corner detection algorithm, a blob detection algorithm, or a ridge detection algorithm. The interest points may represent the positions of distinguishing features in or around the eye of the user (e.g., branching points in the vasculature in the sclera, points with distinct textural features in the iris, or permanent marks on the skin around the eye). After detecting the interest points in the fused image 108, the authentication system 100 may extract a respective feature descriptor from the fused image 108 corresponding to each interest point. The feature descriptors can be represented as ordered collections of numerical values, for example, vectors or matrices of numerical values. The authentication system 100 may extract a feature descriptor corresponding to a particular interest point in any appropriate manner, for example, by extracting a "patch" (e.g., a square or rectangular region) from the fused image in the vicinity of the interest point. The features 106 may be represented by the collection of feature descriptors corresponding to the interest points in the fused image 108. The features 106 may also include data defining the respective interest point position in the fused image 108 (e.g., in x-y coordinates) corresponding to each of the feature descriptors.

Prior to detecting interest points in the fused image 108 (as described above), the authentication system 100 may process the fused image 108 to enhance textural and structural features of the fused image 108. For example, the authentication system 100 may process the fused image 108 using one or more Gabor filters with respective frequencies and orientations. As another example, the authentication system 100 may process the fused image 108 using one or more pre-trained neural network layers (e.g., from a convolutional neural network that has been trained to perform object or texture classification). After extracting the feature descriptors corresponding to the interest points in the fused image 108, the authentication system 100 may reduce the dimensionality of the feature descriptors using an appropriate dimensionality reduction technique, for example, principal component analysis (PCA).

In some implementations, the authentication system 100 may generate the features 106 by generating: (i) a set of "eyeprint" features which characterize the ocular and periocular space outside the iris, and (ii) a set of "iris" features which characterize the iris of the eye. More specifically, the authentication system 100 may generate the eyeprint (or iris) features by processing the portion of the fused image 108 that corresponds to the periocular space outside the iris (or the iris) using any appropriate method. For example, the authentication system 100 may generate the eyeprint (or iris) features by extracting feature descriptors from a set of interest points in the portion of the fused image 108 that corresponds to the ocular and periocular space outside the iris (or the iris). In some cases, the authentication system 100 generates the eyeprint and the iris features using different feature generation methods.

The portion of the fused image 108 corresponding to the ocular and periocular space outside the iris (or the iris) refers to the portion of the fused image 108 corresponding to the portion of the multi-spectral image 110 that depicts the ocular and periocular space outside the iris (or the iris). If the fused image 108 has the same resolution as the multi-spectral image 110, then each component (i.e., pixel) of the fused image 108 corresponds exactly one component (i.e., pixel) in each channel of the multi-spectral image. If the fused image 108 has a lower resolution than the multi-spectral image 110, then each component of the fused image 108 corresponds to one or more components in each channel of the multi-spectral image.

The authentication system 100 can determine which portions of the multi-spectral image 110 depict: (i) the ocular and periocular space outside the iris, and (ii) the iris, by processing the multi-spectral image using a segmentation neural network. The segmentation neural network may be configured to generate a segmentation output that defines, for each component of each channel of the multi-spectral image, a respective likelihood that the component depicts: (i) the ocular space outside the iris, (ii) the iris, (iii) the periocular space and (iv) a region outside the periocular space (background). The segmentation neural network can be trained using any appropriate machine learning training techniques. For example, the segmentation neural network can be trained based on a set of training data that includes multiple training examples. Each training example may include: (i) a training multi-spectral image that depicts an eye, and (ii) a segmentation label that defines whether each component of the training multi-spectral image depicts the ocular space outside the iris, periocular space, the iris, or a region outside the periocular space. In this example, the segmentation neural network can be trained using supervised learning techniques to process each training multi-spectral image to generate a segmentation output that matches the segmentation label for the training multi-spectral image.

The authentication system 100 processes the features 106 using a matching engine 118 to generate a set of one or more match scores 120. Each match score 120 characterizes the likelihood that identity of the user 104 matches the identity of a respective "reference user". A reference user refers to a user for which the authentication system 100 has previously generated an enrollment template 122. An enrollment template 122 for a user refers to data defining "expected values" of the features 106 characterizing an eye of the user.

The authentication system 100 can generate an enrollment template for a user in any appropriate manner. For example, the authentication system 100 can generate an enrollment template for a user by capturing multiple multi-spectral images 110 depicting an eye of the user, for example, from different angles, from different eye openings, at different times, and under different lighting conditions. The authentication system 100 can process each of the multi-spectral images 110 to generate a respective fused image 108 and derive respective features 106. Thereafter, the authentication system 100 can combine the respective features 106 corresponding to each of the multi-spectral images to determine the enrollment template for the user. For example, the authentication system 100 can combine respective collections of feature descriptors corresponding to each of the multi-spectral images by generating a unified set of feature descriptors that includes each of the collections of feature descriptors. In some implementations, the authentication system 100 determines: (i) an "eyeprint enrollment template" by combining the respective eyeprint features corresponding to each of the multi-spectral images, and (ii) an "iris enrollment template" by combining the respective iris features corresponding to each of the multi-spectral images.

The authentication system 100 can generate a match score 120 that characterizes the likelihood that the identity of the user 104 matches the identity of a given reference user in any appropriate manner. A few examples follow.

For example, the authentication system 100 can generate the match score by determining a number of "inliers" between: (i) a collection of "user" feature descriptors corresponding to interest points of the fused image 108, and (ii) a collection of "enrollment" feature descriptors corresponding to the enrollment template of the given reference user. To determine the inliers, the authentication system 100 can determine the parameters of an affine transformation (e.g., represented by a 3×3 matrix), and thereafter apply the affine transformation to the respective interest point position corresponding to each user feature descriptor. A user feature descriptor can be considered an inlier if it "matches" an enrollment feature descriptor, that is, if: (i) the transformed interest point position corresponding to the user feature descriptor is within a threshold distance of the interest point position corresponding to the enrollment feature descriptor; and (ii) a similarity measure between the user feature descriptor and the enrollment feature descriptor exceeds a threshold. The authentication system can determine the affine transformation mapping user interest points to enrollment interest points in any of a variety of ways, for example, using a random sample consensus (RANSAC) iterative stochastic procedure. The authentication system 100 may determine the match score to be the fraction of the collection of user feature descriptors which are determined to be inliers.

As another example, the authentication system 100 can generate the match score by determining a measure of similarity between: (i) an ordered collection of numerical values representing the features 106, and (ii) an ordered collection of numerical values representing the enrollment template 122 of the given reference user. The respective ordered collections of numerical values may be, for example, vectors or matrices of numerical values. The numerical measure of similarity may be, for example, a cosine similarity measure or a similarity measure based on a norm (e.g., an $L_1$, $L_2$, $L_\infty$ norm) of the difference between the ordered collections of numerical values representing the features 106 and the enrollment template 122.

In some implementations, the authentication system 100 generates the match score by determining: (i) a first match score between the eyeprint features 106 and the eyeprint enrollment template, and (ii) a second match score between the iris features 106 and the iris enrollment template. The system may determine the match score as a weighted linear combination of the first match score and the second match score. The weights of the linear combination may be determined based on the characteristics of the multi-spectral image 110. For example, if the iris in the multi-spectral image is obscured by heavy glare or specular reflection, the authentication system 100 may assign a low weight to the second match score in the linear combination.

The authentication system 100 can determine the identity of the user 104 based on the match scores 120. For example, the authentication system 100 can determine that the identity 102 of the user 104 matches the identity of the reference user with the highest match score. In the particular example illustrated by 124, the authentication system 100 determines respective match scores (represented by the height of the vertical bars) for reference users 1, 2, and 3. In this example, the authentication system may determine the user 104 to be reference user 2, because reference user 2 has the highest match score.

More generally, the authentication system 100 may use the features 106 characterizing one or both of the eyes of the user 104 as one of several factors in determining the identity of the user 104. For example, the authentication system 100 may additionally determine the identity of the user based on one or more of: the appearance of the face of the user, the appearance of eyeglasses being worn by the user, the voice of the user, a password submitted by the user, or a combination thereof.

Figure 2:
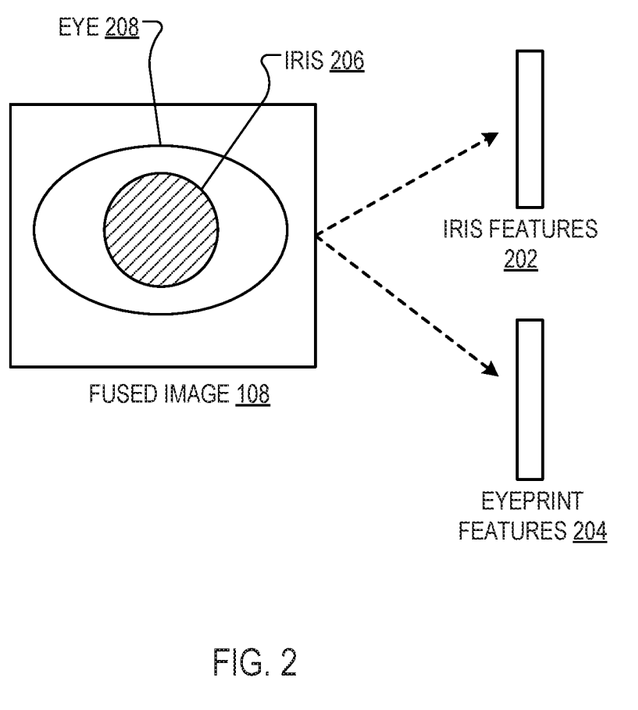
FIG. 2 is an illustration of generating iris features and eyeprint features from a fused image.

FIG. 2 is an illustration of generating iris features 202 and eyeprint features 204 from a fused image 108. As described earlier, the fused image 108 integrates information from each of multiple channels of a multi-spectral image depicting the eye of the user. The authentication system 100 generates the iris features 202 by processing the portion of the fused image that corresponds to the iris 206. The authentication system 100 generates the eyeprint features 204 by processing the portion of the fused image that corresponds to the ocular and periocular space outside the iris of the eye 208.

Figure 3:
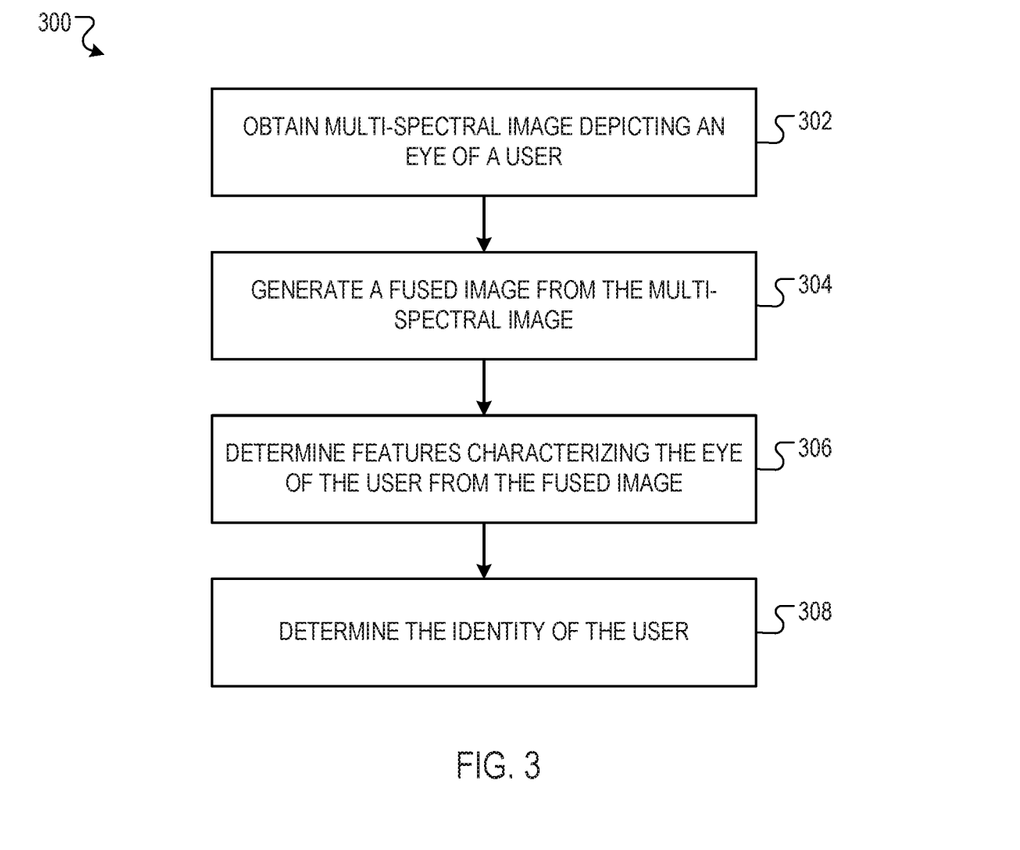
FIG. 3 is a flow diagram of an example process for determining the identity of a user using features characterizing an eye of the user which are generated from a fused image.

FIG. 3 is a flow diagram of an example process 300 for determining the identity of a user using features characterizing an eye of the user which are generated from a fused image. For convenience, the process 300 will be described as being performed by a system of one or more computers located in one or more locations. For example, an authentication system, e.g., the authentication system 100 of FIG. 1, appropriately programmed in accordance with this specification, can perform the process 300.

The system obtains a multi-spectral image depicting the eye of the user (302). As described earlier, the multi-spectral image has multiple registered channels, and each channel corresponds to a respective spectrum of the multi-spectral image. For example, the multi-spectral image may include a red color channel, a green color channel, a blue color channel, an infrared channel, and an ultraviolet channel. The system can capture the multi-spectral image using one or more cameras which may be included in a kiosk or personal device being used by the user.

The system generates a fused image having a single channel by processing the multi-spectral image using an encoder neural network in accordance with current values of a set of encoder neural network parameters (304). The encoder neural network may be, for example, a convolutional neural network having multiple convolutional neural network layers.

The system determines a set of features characterizing the eye of the user from the fused image (306). In particular, the system can generate a set of eyeprint features that characterize the portion of the eye outside of the iris (i.e., some or all of the ocular and periocular space outside of the iris), and a set of iris features that characterize the iris of the eye. The system can generate: (i) the eyeprint features by processing the portion of the fused image that corresponds to the portion of the eye outside of the iris, and (ii) the iris features by processing the portion of the fused image that corresponds to the iris portion of the eye. The system can generate the eyeprint features and the iris features in any appropriate manner, and in general, the system may use different procedures to generate the eyeprint features and the iris features. A few example procedures for generating features from the fused image are described in more detail with reference to FIG. 1.

The system determines the identity of the user based at least in part on the set of features characterizing the eye of the user (308). In particular, the system processes the features characterizing the eye of the user to generate a respective match score between the user and each of one or more reference users. The match score between the user and a reference user characterizes a likelihood that the identity of the user matches the identity of the reference user. The system can determine the match score between the user and a reference user by comparing the features characterizing the eye of the user to an enrollment template characterizing the eye of the reference user. A few example processes for determining the match scores are described with reference to FIG. 1. The system can determine the identity of the user based on the match scores. For example, the system can determine that the identity of the user matches the identity of the reference user with the highest match score.

Figure 4:
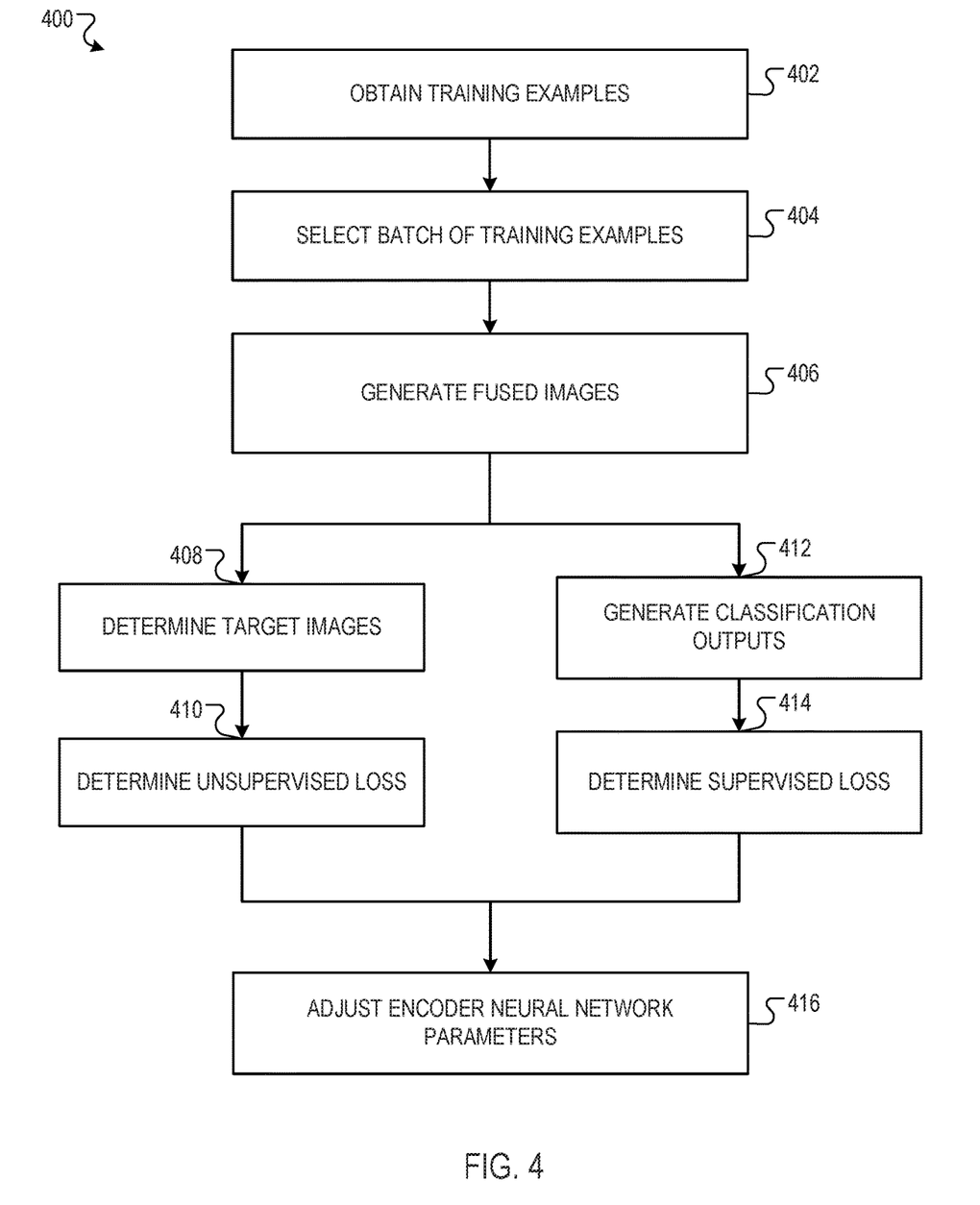
FIG. 4 is a flow diagram of an example process for training an encoder neural network based on a supervised loss function, an unsupervised loss function, or both.

FIG. 4 is a flow diagram of an example process 400 for training an encoder neural network based on a supervised loss function, an unsupervised loss function, or both. For convenience, the process 400 will be described as being performed by a system of one or more computers located in one or more locations. For example, an authentication system, e.g., the authentication system 100 of FIG. 1, appropriately programmed in accordance with this specification, can perform the process 400.

The system obtains a set of multiple training examples (402). Each training example corresponds to a respective "training user" and includes a multi-spectral image that depicts an eye of the training user.

The system selects a batch of multiple training examples (404). For example, the system may select the batch of training examples by randomly sampling a predetermined number of training examples from the set of training examples.

For each training example in the batch, the system processes the multi-spectral image included in the training example to generate a respective fused image (406). As described earlier, the system generates a fused image from a multi-spectral image by processing the multi-spectral image using an encoder neural network, in accordance with the current values of the encoder neural network parameters.

Steps 408-410 describe an example process for determining an "unsupervised" loss for the batch of training examples, and steps 412-414 describe an example process for determining a "supervised" loss for the batch of training examples. The system can determine the unsupervised loss, the supervised loss, or both for the batch of training examples. As will be described in more detail with reference to step 416, the system can determine gradients of the unsupervised loss, the supervised loss, or both, with respective to the parameters of the encoder neural network. Thereafter, the system can use the gradients to adjust the current parameter values of the encoder neural network.

To determine the unsupervised loss for the batch of training examples, the system determines a respective single channel "target image" for the multi-spectral image included in each training example in the batch of training examples (408). To determine the target image for a multi-spectral image, the system segments the multi-spectral image (e.g., using a segmentation neural network) into multiple regions. For example, the system may segment the multi-spectral image into regions which respectively depict: (i) the skin around the eye, (ii) the sclera, and (iii) the iris.

For each region, the system determines a "target region" based on the appearance of the region in one or more channels of the multi-spectral image. For example, for the region which depicts the skin around the eye (the "skin region"), the system may determine the target region as a linear combination of the skin regions of the green and ultraviolet channels. In some cases, prior to determining the linear combination, the system may filter the skin regions of the green and ultraviolet channels, for example, using a contrast limited adaptive histogram equalization (CLAHE) filter. As another example, for the region which depicts the sclera (the "sclera region"), the system may determine the target region to be sclera region of the green channel. In some cases, the system may filter the sclera region of the green channel using, for example, a CLAHE filter, a Gabor filter, or both. As another example, for the region which depicts the iris (the "iris region"), the system may determine the target region to be a linear combination of the iris regions of the infrared and red channels. In some cases, prior to determining the linear combination, the system may filter the iris regions of the infrared and red channels, for example, using a CLAHE filter, a Gabor filter, or both.

After determining the target regions, the system determines the target image by spatially concatenating the target regions. A target image constructed in this manner has the same resolution (i.e., number of rows and columns) as each channel of the original multi-spectral image. In one implementation, contrast adjustments and blending (edges) may be performed to obtain the target region.

The system determines the unsupervised loss (410). In particular, the system determines a respective unsupervised loss for the multi-spectral image included in each training example in the batch of training examples, and thereafter determines the overall unsupervised loss as a combination (e.g., a sum or weighted combination) of the respective unsupervised losses for the multi-spectral images. To determine the unsupervised loss for a multi-spectral image, the system determines a measure of similarity (e.g., a structural similarity index (SSIM), a mean squared error, an adversarial loss, a combination of thereof) between: (i) the fused image, and (ii) the target image, for the multi-spectral image. For example, the system may determine the unsupervised loss as:

$$\mathcal{L}_u = \sum_{i=1}^{N} S(F_i, T_i) \quad (1)$$

where i indexes the multi-spectral images, N is the total number of multi-spectral images in the current batch of training examples, $S$ is a similarity measure, $F_i$ is the fused image for multi-spectral image i, and $T_i$ is the target image for multi-spectral image i.

In one implementation, the SSIM can be computed between the edge responses from target image and fused image. The edge information can be extracted by one or more methods, for example: image gradients, Sobel filters, Haar filters, accumulating phase or magnitude information from one or more real and imaginary Gabor kernels.

To determine the supervised loss, for each training example, the system processes the fused image corresponding to the training example using a classification neural network to generate a classification output (412). The classification output for a fused image defines a prediction of the identity of the training user corresponding to the fused image. For example, the classification neural network may be a convolutional neural network with an output layer that includes a respective neuron corresponding to each training user. In this example, the activation value of a neuron of the output layer indicates a probability that the identity of the training user corresponding to the fused image matches the identity of the training user corresponding to the neuron. In some cases, the classification neural network may include an "iris" sub-network, an "eyeprint" sub-network, and a fusion sub-network. The iris sub-network may be configured to process the portion of the fused image corresponding to the iris, and the eyeprint sub-network may be configured to process the portion of the fused image corresponding to the ocular and periocular space outside the iris. The fusion sub-network may be configured to process the concatenated outputs of the iris sub-network and the eyeprint sub-network to generate the classification output.

Generally, the system can generate the classification outputs using any differentiable classification procedure (i.e., the system is not restricted to generating the classification outputs using a classification neural network).

The system determines a supervised loss for each training example (414). In particular, the system determines a respective supervised loss for each training example in the batch of training examples, and thereafter determines the overall supervised loss as a combination (e.g., a sum or weighted combination) of the respective supervised loss for each training example. The supervised loss for a training example characterizes whether the classification output for the training example accurately predicts the identity of the training user corresponding to the training example. In one example, the system determines the supervised loss as:

$$\mathcal{L}_s = \sum_{i=1}^{N} \mathcal{L}_i(C_i, I_i) \quad (2)$$

where i indexes the training examples, N is the total number of training examples in the current batch of training examples, and $\mathcal{L}_i(C_i, I_i)$ is a cross-entropy loss between: (i) the classification output $C_i$ predicting the identity of the training user corresponding to training example i and, (ii) the target output $I_i$ which defines the identity of the training user corresponding to training example i.

The system adjusts the current values of the encoder neural network parameters based on the unsupervised loss, the supervised loss, or both (414). More specifically, the system determines gradients of the unsupervised loss, the supervised loss, or both, with respect to the parameters of the encoder neural network. The system can also adjust the current values of the classification neural network parameters using gradients of the supervised loss with respect to the classification neural network parameters. The system can determine the gradients using any appropriate procedure, for example, a backpropagation procedure. The system can use the gradients to adjust the current values of the encoder neural network parameters (and, optionally, the classification neural network parameters) using the update rule of any appropriate gradient descent optimization algorithm (e.g., the Adam or RMSprop algorithm).

After adjusting the current values of the encoder neural network parameters, the system determines whether a training termination criterion is satisfied. For example, the system may determine a training termination criterion is satisfied if the system has performed a predetermined number of training iterations. Each iteration of the steps 404-414 is referred to as a "training iteration". As another example, the system may determine that a training termination criterion is satisfied if a change in the value of the unsupervised loss function or the supervised loss function between training iterations is below a predetermined threshold. In response to determining that a training termination criterion is not satisfied, the system can return to step 404 and perform another training iteration. In response to determining that a training termination criterion is satisfied, the system can output or store the trained parameter values of the encoder neural network.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

In this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a sub combination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method performed by one or more data processing apparatus, the method comprising:
    obtaining a multi-spectral image that depicts an eye of a user, wherein the multi-spectral image comprises a plurality of registered two-dimensional channels, and each two-dimensional channel corresponds to a different spectrum of the multi-spectral image;
    processing the multi-spectral image using an encoder neural network to generate a fused image, wherein the fused image has a single two-dimensional channel;
    determining a set of features characterizing the eye of the user from the fused image; and
    determining an identity of the user based at least in part on the set of features characterizing the eye of the user, comprising:
        using the set of features characterizing the eye of the user to determine a respective match score between the user and each of one or more reference users, wherein the match score between the user and a reference user characterizes a likelihood that the identity of the user matches an identity of the reference user; and
        determining the identity of the user matches the identity of a particular reference user based on the match scores.

2. The method of claim 1, wherein the multi-spectral image comprises one or more of: a red color channel, a green color channel, a blue color channel, an infrared channel, and an ultraviolet channel.

3. The method of claim 1, wherein the encoder neural network comprises a plurality of convolutional neural network layers.

4. The method of claim 1, wherein determining the set of features characterizing the eye of the user from the fused image comprises:
    identifying positions of a plurality of interest points in the fused image; and generating a respective feature descriptor corresponding to each interest point using the fused image.

5. The method of claim 1, wherein determining a match score between the user and a reference user comprises:
   determining a first match score based on eyeprint features that characterize a portion of the eye outside an iris of the eye;
   determining a second match score based on iris features that characterize the iris of the eye; and
   determining the match score based on the first match score and the second match score.

6. The method of claim 1, wherein the encoder neural network is trained by a plurality of operations comprising:
   obtaining a training multi-spectral image;
   processing the training multi-spectral image using the encoder neural network, in accordance with current values of encoder neural network parameters, to generate a training fused image;
   generating a target image, comprising:
      segmenting the training multi-spectral image into multiple regions;
      determining, for each region, a target region based on an appearance of the region in one or more channels of the training multi-spectral image; and
      spatially concatenating the target regions to generate the target image;
   determining gradients of an unsupervised loss with respect to the encoder neural network parameters, wherein the unsupervised loss comprises a measure of similarity between: (i) the training fused image, and (ii) the target image; and
   using the gradients to adjust the current values of the encoder neural network parameters.

7. The method of claim 6, wherein the multiple regions comprise one or more of: a skin region, a sclera region, and an iris region.

8. The method of claim 1, wherein the encoder neural network is trained by a plurality of operations comprising:
   obtaining a training multi-spectral image that depicts an eye of a training user;
   processing the training multi-spectral image using the encoder neural network, in accordance with current values of encoder neural network parameters, to generate a training fused image;
   processing the training fused image using a classification neural network, in accordance with current values of classification neural network parameters, to generate a classification output that characterizes a predicted identity of the training user;
   determining gradients of a supervised loss with respect to the encoder neural network parameters, wherein the supervised loss is based on the classification output; and
   using the gradients to adjust the current values of the encoder neural network parameters.

9. A system comprising:
   one or more computers; and
   one or more storage devices communicatively coupled to the one or more computers, wherein the one or more storage devices store instructions that, when executed by the one or more computers, cause the one or more computers to perform operations comprising:
      obtaining a multi-spectral image that depicts an eye of a user, wherein the multi-spectral image comprises a plurality of registered two-dimensional channels, and each two-dimensional channel corresponds to a different spectrum of the multi-spectral image;
      processing the multi-spectral image using an encoder neural network to generate a fused image, wherein the fused image has a single two-dimensional channel;
      determining a set of features characterizing the eye of the user from the fused image; and
      determining an identity of the user based at least in part on the set of features characterizing the eye of the user, comprising:
         using the set of features characterizing the eye of the user to determine a respective match score between the user and each of one or more reference users, wherein the match score between the user and a reference user characterizes a likelihood that the identity of the user matches an identity of the reference user; and
         determining the identity of the user matches the identity of a particular reference user based on the match scores.

10. The system of claim 9, wherein the multi-spectral image comprises one or more of: a red color channel, a green color channel, a blue color channel, an infrared channel, and an ultraviolet channel.

11. The system of claim 9, wherein the encoder neural network comprises a plurality of convolutional neural network layers.

12. The system of claim 9, wherein determining the set of features characterizing the eye of the user from the fused image comprises:
   identifying positions of a plurality of interest points in the fused image; and
   generating a respective feature descriptor corresponding to each interest point using the fused image.

13. The system of claim 9, wherein determining a match score between the user and a reference user comprises:
   determining a first match score based on eyeprint features that characterize a portion of the eye outside an iris of the eye;
   determining a second match score based on iris features that characterize the iris of the eye; and
   determining the match score based on the first match score and the second match score.

14. One or more non-transitory computer storage media storing instructions that when executed by one or more computers cause the one or more computers to perform operations comprising:
   obtaining a multi-spectral image that depicts an eye of a user, wherein the multi-spectral image comprises a plurality of registered two-dimensional channels, and each two-dimensional channel corresponds to a different spectrum of the multi-spectral image;
   processing the multi-spectral image using an encoder neural network to generate a fused image, wherein the fused image has a single two-dimensional channel;
   determining a set of features characterizing the eye of the user from the fused image; and
   determining an identity of the user based at least in part on the set of features characterizing the eye of the user, comprising:
      using the set of features characterizing the eye of the user to determine a respective match score between the user and each of one or more reference users, wherein the match score between the user and a reference user characterizes a likelihood that the identity of the user matches an identity of the reference user; and determining the identity of the user matches the identity of a particular reference user based on the match scores.

15. The non-transitory computer storage media of claim 14, wherein the multi-spectral image comprises one or more of: a red color channel, a green color channel, a blue color channel, an infrared channel, and an ultraviolet channel.

16. The non-transitory computer storage media of claim 14, wherein the encoder neural network comprises a plurality of convolutional neural network layers.

17. The non-transitory computer storage media of claim 14, wherein determining the set of features characterizing the eye of the user from the fused image comprises:
   identifying positions of a plurality of interest points in the fused image; and
   generating a respective feature descriptor corresponding to each interest point using the fused image.

* * * * *

UNITED STATES PATENT AND TRADEMARK OFFICE
CERTIFICATE OF CORRECTION

| | | |
|---|---|---|
| PATENT NO. | : 10,853,642 B2 | Page 1 of 1 |
| APPLICATION NO. | : 16/361453 | |
| DATED | : December 1, 2020 | |
| INVENTOR(S) | : Vikas Gottemukkula | |

It is certified that error appears in the above-identified patent and that said Letters Patent is hereby corrected as shown below:

On the Title Page

Column 1, item (71), (Applicant), Line 1, delete "Alibaba Group Holding Limited," insert
-- Advanced New Technologies Co., Ltd., --, therefor.

Signed and Sealed this
Twenty-fifth Day of May, 2021

Drew Hirshfeld
*Performing the Functions and Duties of the*
*Under Secretary of Commerce for Intellectual Property and*
*Director of the United States Patent and Trademark Office*